United States Patent [19]

Bender et al.

[11] Patent Number: 5,324,350
[45] Date of Patent: Jun. 28, 1994

[54] CYCLOPENTADIENE-MODIFIED ALKYD RESINS

[75] Inventors: Albert Bender; Lothar Bothe, both of Mainz; Gerhard Werner, Glashuetten, all of Fed. Rep. of Germany

[73] Assignee: Hoechst Aktiengesellschaft, Fed. Rep. of Germany

[21] Appl. No.: 24,938

[22] Filed: Mar. 2, 1993

[30] Foreign Application Priority Data

Mar. 4, 1992 [DE] Fed. Rep. of Germany ....... 4206698

[51] Int. Cl.$^5$ .............................................. C09D 11/06
[52] U.S. Cl. .................... 106/27 R; 528/272; 528/295.5; 528/296; 528/298; 528/300; 528/301; 528/302; 528/303; 528/306; 528/308; 528/308.6; 525/39; 525/44; 525/48; 525/49
[58] Field of Search .................... 528/272, 295.5, 296, 528/298, 300, 301, 302, 303, 306, 308, 308.6; 525/39, 44, 48, 49; 106/27 R

[56] References Cited

U.S. PATENT DOCUMENTS

| 4,072,642 | 2/1978 | Ritz et al. ............................. 528/298 |
| 4,105,607 | 8/1978 | Fischer et al. ................... 525/133.5 |
| 4,383,860 | 5/1983 | Uhlemayr et al. ..................... 106/27 |
| 4,976,783 | 12/1990 | Werner ................................. 106/20 |

FOREIGN PATENT DOCUMENTS

| 0042515 | 12/1981 | European Pat. Off. . |
| 2441922 | 3/1976 | Fed. Rep. of Germany . |
| 2349611 | 11/1977 | France . |

OTHER PUBLICATIONS

Copy of European Search Report (4 pages).
Copy of Chem. Abstracts vol. 110, No. 26 (1 page).
Copy of Abstract No. 233263 (1 page).
Copy of DD-A-258 533 (1 page).

*Primary Examiner*—Samuel A. Acquah
*Attorney, Agent, or Firm*—Bierman and Muserlian

[57] ABSTRACT

Cyclopentadiene-modified alkyd resins obtained by reaction of naturally occurring, unsaturated fatty acid esters with cyclopentadiene compounds under pressure, transesterification of the resulting adducts with polyols which contain at least three hydroxyl groups, and esterification with aromatic or cycloaliphatic polycarboxylic acids or anhydrides thereof. These resins are employed in the preparation of printing inks for offset printing. The novel resins impart an improved gloss to these printing inks.

6 Claims, No Drawings

CYCLOPENTADIENE-MODIFIED ALKYD RESINS

The invention relates to novel dicyclopentadiene-modified alkyd resins which can advantageously be used in offset printing inks. The novel resins generate an increased gloss development in offset printing inks.

Inks for offset printing usually comprise alkyd resins. These have the task, on the one hand, of ensuring compatability between the resins on which the ink is based and mineral oils. On the other hand, however, they also have binder properties, i.e. they should allow good wetting of pigments and film formation, imparting a good abrasion resistance to the print. In addition to this protective function, however, their particular task is to give the ink film a high gloss. This is particularly desirable for an optically attractive printing result.

Alkyd resins which are prepared from esters of vegetable fatty acids, the free hydroxyl groups of which are further esterified with polybasic carboxylic acids, are usually used for this intended application. These systems achieve a level of gloss which cannot be increased further on this basis without involving losses, for example during drying or in abrasion resistance.

The object of the present invention is to develop novel systems with which the gloss can be increased further, while retaining the superior properties.

It has been possible to achieve this object in an unexpected manner by providing alkyd resins having cyclopentadiene units, which are prepared by reaction of vegetable oils (I) with cyclopentadiene compounds (II), transesterification of the resulting adduct with polyols (III) and esterification of free hydroxyl groups with polycarboxylic acids or anhydrides thereof (IV).

The addition of cyclopentadiene onto naturally occurring oils or fatty acids thereof, and further processing thereof to give polyester resins containing fatty acids, has already been reported in the literature [Fette-Seifen-Anstrichmittel, Volume 66(1964), page 670]. However, these products are built up differently to those of the present invention and are unsuitable for use in printing inks. The same also applies to air-drying, fatty acid-modified alkyd resins for use in paints, such as are described, for example, in German Patent Application P 2,441,922. These alkyd resins are built up from unsaturated dicarboxylic acids, if appropriate aromatic or cyclic polycarboxylic acids, at least trihydric alcohols, naturally occurring unsaturated fatty acid esters and dicyclopentadiene. These resins thus largely contain the same units as the resins according to the invention which are described below. In both cases, however, the starting compounds are reacted with one another in an entirely different sequence, so that resins having completely different properties are obtained.

The invention relates to novel cyclopentadiene-modified alkyd resins which are obtained by reaction of naturally occurring, unsaturated fatty acid esters (I) with cyclopentadiene compounds (II) under pressure, transesterification of the resulting adducts with polyols (III) which contain at least three hydroxyl groups, and esterification with aromatic or cycloaliphatic polycarboxylic acids or anhydrides thereof (IV).

All the naturally occurring unsaturated fatty acid esters can be used as component I in the first reaction stage. Examples which may be mentioned are soya oil, linseed oil, cottonseed oil, tobacco seed oil, fish oil, dehydrated castor oil, safflower oil, sunflower oil, poppy seed oil, tall oil and wood oil. The oils can be employed by themselves or as mixtures.

Cyclopentadiene compounds II, which are liquids, are to be understood as meaning cyclopentadiene, oligomers thereof, such as di-, tri- and tetramers obtainable by Diels-Alder addition, and the alkyl derivatives or cooligomers of these compounds, for example methylcyclopentadiene, cyclopentadiene/isoprene dimers and cyclopentadiene/piperylene dimers. The starting substances in question do not have to have a high degree of purity. For example, it is possible to use fractions, in particular concentrated fractions, which are formed by thermal dimerisation of a C5 fraction, this C5 fraction being obtained as a by-product of thermal decomposition of naphtha and corresponding petroleum fractions. During such a dimerisation, the cyclopentadiene or methylcyclopentadiene contained in such a fraction is converted into dicyclopentadiene, dimethyldicyclopentadiene, a dimer of cyclopentadiene and methylcyclopentadiene, a dimer of cyclopentadiene and isoprene, a dimer of cyclopentadiene/ piperylene and other corresponding dimeric substances.

These fractions can also contain other unsaturated monomers, such as, for example, propylene, butene, butadiene, pentene, cyclopentene or cyclohexene.

So-called C9 fractions which are formed as a by-product of cracking of naphtha and the like can also be present. These fractions then comprise, for example, styrene, alpha-methylstyrene, vinyltoluene, indene, methylindene or mixtures thereof.

A relatively high purity of component II is accordingly not always necessary, but it is preferable for the cyclopentadiene units to be present in an amount of 70% by weight or more.

The copolymerisation of I with II, which can be carried out in the presence of catalysts or, preferably, without catalysts, i.e. purely thermally, can preferably be carried out in bulk, but also in the presence of inert solvents. Suitable solvents for this purpose are, for example, aromatic hydrocarbons, such as benzene, toluene, xylenes and tetrahydronaphthanene, aliphatic hydrocarbons, such as isooctane, white spirit and mixtures of alkylated benzenes having a boiling range of 100° to 200° C. Suitable catalysts for free radical polymerization, which is less preferred, are, for example, peroxides, such as di-tert-butyl peroxide, benzoyl peroxide, tert-butyl hydroperoxide, cumene hydroperoxide or the like. Because of the high reaction temperature, the process is carried out under increased pressure. This is preferably up to 10 bar. Because of the sensitivity of the reaction products to oxidation, it is moreover advantageous to carry out the reaction in the atmosphere of a gas which is inert under the reaction conditions, such as nitrogen or carbon dioxide.

The reaction of components I and II is carried out at an elevated temperature of 200° to 300° C., preferably between 230° and 270° C., the weight content of component II being between 5 and 95%, preferably between 10 and 50%, based on this reaction mixture. Weight contents of between 15 and 30% are especially preferred.

The first stage of the process can be carried out in various ways. For smaller batches, it is possible for components I and II to be introduced into the reaction vessel together and then to be heated up to the desired temperature. For larger batches, however, it is advisable, because of the heat of the reaction which occurs, for the fatty acid ester I to be initially introduced into the reaction vessel and heated to the reaction temperature and for the cyclopentadiene compounds II then to be metered in. However, it is also possible to heat the solvent and then to meter in I and II, separated or as a mixture, with or without solvents. When the reaction has ended, the resulting copolymers can be isolated as liquids by distilling off the solvents and unreacted monomers. However, it is simpler for the copolymers obtained by reaction of I with II to be reacted with the polyols III without prior isolation. This embodiment is therefore preferred.

Possible polyols III in the second reaction stage are all the alcohols which are at least trihydric and are usually used for the preparation of alkyd resins, i.e., for example, glycerol, trimethylolethane, trimethylolpropane, dimethylolpropane, pentaerythritol, di-pentaerythritol and sorbitol, in each case by themselves or as a mixture. If appropriate, mixtures with diols, for example ethylene glycol, propylene glycol, butylene 1,3-glycol, diethylene glycol or neopentyl glycol, can also be employed.

The transesterification reaction is carried out by heating the adducts formed in the first reaction stage to the desired temperature with the polyols in bulk. It is of course also possible to add solvents to the batch. Possible solvents are those mentioned above. This transesterification is likewise carried out at an elevated temperature of between 100° and 270° C., preferably between 200° and 260° C., the weight content of component III, based on the reaction product of I with II, being between 1 and 30%, preferably between 5 and 20%.

The transesterification ends after 5 hours at the most. It can be accelerated by the customary transesterification catalysts such as, for example, triphenyl phosphite, bicyclic phosphites, organic tin compounds, such as dibutyltin oxide, and metal salts, oxides and hydroxides, such as calcium acetate, lead oxide or lithium hydroxide. These catalysts are usually employed in an amount of up to 0.2% by weight of the total batch.

The reaction with aromatic or cycloaliphatic polycarboxylic acids, or anhydrides IV thereof, or with mixtures thereof, is carried out in the third reaction stage. Possible for use here are, preferably, orthophthalic anhydride, tetrahydrophthalic anhydride, trimellitic anhydride, pyromellitic anhydride, endomethylenetetrahydrophthalic anhydride, isophthalic and terephthalic acid. The use of aromatic dicarboxylic acids or anhydrides thereof is preferred. Minor amounts of aromatic monocarboxylic acids, such as benzoic acid or p-tert-butylbenzoic acid, can also be concomitantly used. The amounts of these, however, are then not more than 20% by weight, based on component IV.

This esterification with polycarboxylic acids or anhydrides IV thereof is carried out at an elevated temperature of between 100° and 270° C., preferably between 120° and 260° C., the weight content of component IV, based on the fatty acid ester containing hydroxyl groups, being between 1 and 50%, preferably between 5 and 30%. The reaction water formed during esterification of the fatty acid esters containing hydroxyl groups with components IV to give the alkyd resins according to the invention can be removed with the aid of entraining agents, such as xylene or white spirit. However, this is expediently distilled off when the reaction has ended, since it can interfere with the properties of the alkyd resin. The progress of the reaction can be monitored conveniently by determination of characteristic parameters, such as, for example, acid number or viscosity, and ended at the desired values.

The alkyd resins prepared according to the invention have a consistency which ranges from liquid to pasty. This corresponds to a viscosity range from about 5 to 500 Pa.s/23° C. If appropriate, the viscosity of the products can also lie above or below this stated range, but this range is of particular interest because of the usefulness of the products as printing ink binders. The products have particularly advantageous properties if their acid number is less than 30 mg of KOH/g of resin. However, products having an acid number below 20 mg of KOH/g of resin are preferred, and those having an acid number below 10 mg of KOH/g of resin are especially preferred. These ranges can also be varied widely by the quantitative weight ratios or molar ratios of the individual components with respect to one another. The products are very storage-stable, i.e. they do not tend to form a skin. If appropriate, however, the customary stabilizers, such as hydroquinone, can be added. The amounts here are up to 0.5% by weight, based on the total batch.

The molecular weights of the resins according to the invention can be determined by gel permeation chromatography of solutions of the resins in tetrahydrofuran on polystyrene foam in a permeation measuring instrument by known methods. According to the resulting measurement values, the molecular weight (weight-average $M_W$) of the resins according to the invention preferably has values of $M_W > 1000$, and has no critical upper limit. However, the molecular weights $M_W$ are particularly preferably in an average range of between 3000 and 30000, in particular 4000 to 20000.

The products prepared according to the invention can be readily dissolved in solvents which are usually used for the preparation of inks for offset printing, i.e., for example, in high-boiling mineral oil having a boiling range of 260° to 290° C. Such resin solutions exhibit excellent wetting of pigments, printing inks prepared from them producing rapidly drying printing films having a good abrasion resistance and high gloss.

The following examples serve to illustrate the invention, but without limiting it.

EXAMPLE 1

Preparation of an Alkyd Resin Modified With Dicyclopentadiene and Soya Oil 608 g of soya oil are heated to 260° C. in a 3 litre pressure container. 192 g of 75% strength dicyclopentadiene are metered in over a period of 1 hour. After 5 hours, the initial pressure of 5 bar has fallen to 1 bar. The mixture is then cooled to 240° C., and 60 g of trimethylolpropane and 1 g of triphenyl phosphite are added. After 2 hours, 110 g of isophthalic acid are added carefully, and the water of reaction formed is distilled off azeotropically with xylene. As soon as an acid number of 10 mg of KOH/g of resin is reached, the xylene is distilled off in vacuo under 60 mbar for 15 minutes. 912 g of alkyd resin which has a viscosity of 150 dPa.s/23° C., an acid number of 8 mg of KOH/g of resin and a molecular weight $M_W$ of 5630 are obtained.

EXAMPLE 2

Preparation of an Alkyd Resin Modified With Dicyclopentadiene, Soya Oil and Linseed Oil 1710 g of linseed oil and 570 g of soya oil are heated to 260° C. in a 5 litre pressure container. 720 g of 75% strength dicyclopentadiene are metered in over a period of 1 hour. After 5 hours, the pressure, which initially rose to 4 bar, has fallen to 0.5 bar. The mixture is then cooled to 240° C., and 236 g of trimethylolpropane and 3 g of lithium hydroxide are added. After 2 hours, 423 g of isophthalic acid are added carefully, and the water of reaction formed is distilled off azeotropically with xylene. As soon as the acid number has fallen below 16 mg of KOH/g of resin, the xylene is distilled off in vacuo under 60 bar in the course of 15 minutes. 1.5 g of hydroquinone are then also stirred in. 3660 g of alkyd resin which has a viscosity of 1400 dPa.s/23° C., an acid number of 9 mg of KOH/g of resin and a molecular weight $M_W$ of 16600 are obtained.

Printing inks were prepared according to the following procedure from the product of Example 2 and a commercially available alkyd resin which is prepared from linseed oil, trimethylolpropane and isophthalic acid (acid number 8 mg of KOH/g of resin; viscosity 1100 dPa.s), and their use properties were tested.

A starting varnish which comprises 25% by weight of alkyd resin, 25% by weight of a commercially available colophony resin modified with phenolic resin and 50% by weight of high-boiling mineral oil having a boiling range 260° to 290° C. is prepared.

Printing inks which comprise 84% by weight of varnish and 16% by weight of pigment are prepared therefrom with litholrubin by dispersion on a triple roll mill.

These inks were printed onto coated paper on a trial printing unit from Prüfbau, and sample prints with the same amount of ink transferred were evaluated. The stickiness of the inks, gloss and color density of the print films and their absorption properties and abrasion resistance were determined.

The results of tests on these printing inks can be seen from the table. The terms in the table have the following meanings:

Stickiness: (measure of color transfer) measured with an Inkomat from Prüfbau

Gloss, color density: measured with a laboratory reflectometer from Lange, angle of incidence 60°

Absorption (measure of drying): the evaluation is performed with the aid of the trial printing unit, the proof being reversed laterally with non-printed paper immediately after being produced. The less ink transferred by the lateral reversing, the better the drying. The evaluation is visual.

ABRISION TEST

Mechanical Stress on the Print Film by a Rotating Brush; Visual Evaluation

| | Resin from | |
|---|---|---|
| | Example 2 | Commercially available alkyd resin |
| Viscosity of the starting varnish [Pa · s/23° C.] | 4.2 | 4.9 |
| Viscosity of the printing ink [Pa · s/23° C.] | 16.8 | 19.9 |
| Stickiness | 7.4 | 7.1 |
| Gloss [%] | 89.3 | 76.0 |
| Color density | 2.3 | 2.2 |
| Absorption | No difference | |
| Abrasion resistance | No difference | |

I claim:

1. A cyclopentadiene-modified alkyd resin obtained by reaction of naturally occurring, unsaturated fatty acid esters with cyclopentadiene compounds under pressure, transesterification of the resulting adducts with polyols which contain at least three hydroxyl groups, and esterification with aromatic or cycloaliphatic polycarboxylic acids or anhydrides thereof.

2. A cyclopentadiene-modified alkyd resin as claimed in claim 1, which is obtained by reaction of fatty acid esters and cyclopentadiene compounds under a pressure of up to 10 bar.

3. A cyclopentadiene-modified alkyd resin as claimed in claim 1, which is obtained from soya oil, linseed oil, cottonseed oil, tobacco seed oil, fish oil, dehydrated castor oil, safflower oil, sunflower oil, poppy seed oil, tall oil or wood oil.

4. A cyclopentadiene-modified alkyd resin as claimed in claim 1, which is obtained from glycerol, trimethylolethane, trimethylolpropane, di-trimethylolpropane, pentaerythritol, di-pentaerythritol or sorbitol, in each case by themselves or as a mixture.

5. A cyclopentadiene-modified alkyd resin as claimed in claim 1, which is obtained from ortho-phthalic anhydride, tetrahydrophthalic anhydride, trimellitic anhydride, pyromellitic anhydride, endomethylenetetrahydrophthalic anhydride, or isophthalic acid, terephthalic acid or anhydrides thereof, 6. Offset printing inks containing cyclopentadiene-modified alkyd resins of claim 1.

* * * * *